United States Patent [19]

Colombo et al.

[11] Patent Number: 4,458,864

[45] Date of Patent: Jul. 10, 1984

[54] MEDICAL COMPLEX FOR INSTALLATION IN A STANDARD AIRCRAFT TO CONVERT IT INTO AN AMBULANCE AIRCRAFT

[75] Inventors: Adalgiso Colombo, Segrate; Antonio Guffanti, Fenegró; Piero G. Marello, Florence; Marco G. Pedrazzi, Milan; Roberto Schellino, Lecco; Carlo C. Valagussa, Milan, all of Italy

[73] Assignee: Hosp. Ital LL. E.M. S.p.A., Milan, Italy

[21] Appl. No.: 254,857

[22] Filed: Apr. 16, 1981

Related U.S. Application Data

[63] Continuation of Ser. No. 5,797, Jan. 23, 1979, abandoned.

[30] Foreign Application Priority Data

Jan. 31, 1978 [IT] Italy ............................... 19815 A/78

[51] Int. Cl.³ .............................................. B64D 11/00
[52] U.S. Cl. .................................. 244/118.5; 244/120; 296/164; 105/329 R
[58] Field of Search .......................... 244/118.1–118.6, 244/117 R, 119, 120, 137 R, 137 P; 296/164, 165, 197, 176, 175, 19, 26, 64–65; 52/64, 65, 67, 79.5, 143, DIG. 14; 105/329 R, 238 R; 410/100, 103, 108, 113–115

[56] References Cited

U.S. PATENT DOCUMENTS

| | | | |
|---|---|---|---|
| 2,425,499 | 8/1947 | Watter | 244/118.1 |
| 2,715,008 | 8/1955 | Huber | 410/103 |
| 2,765,499 | 10/1956 | Couse et al. | 296/176 |
| 2,904,850 | 9/1959 | Couse et al. | 52/79.5 |
| 3,147,942 | 9/1964 | Griffith | 244/118.3 |
| 3,361,396 | 1/1968 | Reno | 244/118.1 |
| 3,520,555 | 7/1970 | Blair | 410/100 |
| 3,841,691 | 10/1974 | Byer | 296/26 |
| 3,880,458 | 4/1975 | Jackson | 296/164 |
| 3,924,889 | 12/1975 | Gogush | 296/176 |
| 4,163,577 | 8/1979 | Vanderslice | 296/164 |

FOREIGN PATENT DOCUMENTS

| | | | |
|---|---|---|---|
| 1233980 | 2/1967 | Fed. Rep. of Germany | 296/19 |
| 1,918,403 | 11/1970 | Fed. Rep. of Germany | 244/118.5 |
| 2741126 | 3/1979 | Fed. Rep. of Germany | 296/19 |
| 2398639 | 3/1979 | France | 296/165 |

OTHER PUBLICATIONS

United Aircraft 1963 Pictoral Report, "Manned Flight", pp. 14–15.
Aviation Week, Aug. 24, 1959, pp. 29, 92, 93 "Sikorsky S-60", Vertol YHC-1B.
C-15, McDonald Douglas Corp. brochure Printed 9-1977, #B7-622.

*Primary Examiner*—Galen L. Barefoot
*Attorney, Agent, or Firm*—Morgan, Finnegan, Pine, Foley & Lee

[57] ABSTRACT

This invention relates to a medical complex comprising an integrated assembly of medical equipment and fittings as well as an outer container and a general services network, suitable for quick installation in a standard aircraft to transform it into an ambulance aircraft and removal therefrom, which complex is apt to operate both on the ground and in flight.

4 Claims, 16 Drawing Figures

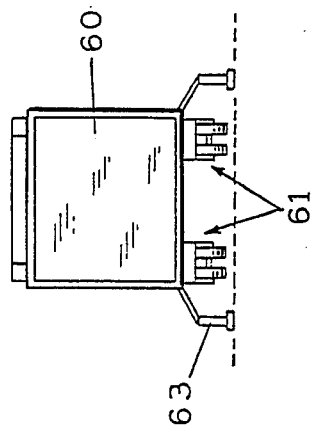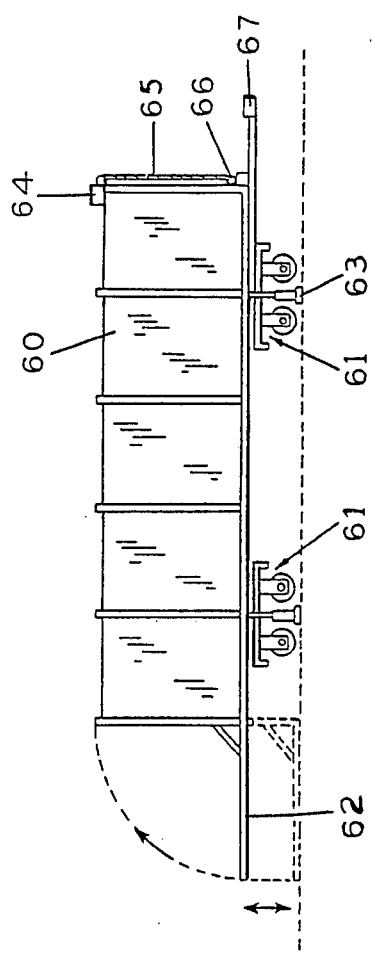

MEDICAL COMPLEX FOR INSTALLATION IN A STANDARD AIRCRAFT TO CONVERT IT INTO AN AMBULANCE AIRCRAFT

This is a continuation of application Ser. No. 005,797 filed Jan. 23, 1979, now abandoned.

This invention relates to a medical complex or series of complexes with constructional characteristics which make them suitable for transportation by a standard aircraft, such as to convert it into an ambulance aircraft. Each complex is constituted by the necessary medical equipment and fittings disposed and fixed in a suitable container which can be anchored to the aircraft by suitable devices. Hereinafter, the term "medical complex" will be abbreviated to "complex".

The present invention also relates to complexes for enabling them to operate on the ground and for facilitating their loading into and unloading from the aircraft. Ambulance aircraft of a first type are known, which are suitable for transporting the injured to the nearest hospital where the necessary operations and treatments are to be carried out, but these have the serious limitation of not enabling operations to be carried out on the scene of the incident.

Ambulance aircraft of a second type are also known, which are permanently fitted with medical and surgical equipment to enable the injured to be directly treated at the scene of the incident, so avoiding subjecting them to the risks incurred in emergency transportation before the urgent operation. Although these aircraft have obvious advantages over those of the first type, they have certain drawbacks, the greatest of which is the small amount of time for which they are used, and in fact they remain unused for most of the time.

In addition, in order to effectively cover the vast range of emergency operations on persons suffering as a result of war, fire, epidemics, traffic accidents, and natural events such as earthquakes, avalanches, floods, etc., it would be necessary to have available various ambulance aircraft each different from the other, according to its specific function.

This would therefore immobilise costly aircraft for their entire life, and their periods of operation would cover only a minimum part of the flying time for which the aircraft were constructed. Finally, during ordinary maintenance, emergency maintenance and/or modifications to the instrumentation or medical and surgical equipment, the ambulance aircraft of the second type is not available for service.

The present invention obviates the aforesaid drawbacks, and presents other advantages which will be apparent from the following description.

The present invention provides a medical complex (or several complexes, as will be apparent hereinafter) for installation in a standard aircraft in order to convert it into an ambulance aircraft, which is able to operate both on the ground and in flight, and is essentially constituted by an integrated assembly of medical equipment and fittings, an outer container and a general services network, the complex being able to be anchored to the aircraft in a removable manner, so enabling it to be unloaded at its place of destination.

Several complexes can obviously be connected together to form an effective integrated unit.

On unloading the complex or complexes, the aircraft is again converted into its standard version, and can be used for other applications, while the complexes can be again made operable on the ground by supplying them with electricity produced by the electrical generator provided. Water can be taken from the tank, which can also be provided.

The container dimensions are defined according to the dimensions of the aircraft hold and of the medical installations, which can be miniaturised to reduce their bulk, and according to the number of persons, medical personnel and patients.

The complexes, or rather their containers, are constructed in modular dimensions, and can be of different lengths according to the activities carried out in them. For example, the complex provided with the operating table is generally longer than the complex for preanaesthesia, post-operational observation, reanimation and intensive care.

In certain cases in which the height of the aircraft's hold is sufficient to house complexes in which a person can stand upright, but in which the passage of the complex is hindered by the small dimensions of the loading and unloading door, complexes of variable volume are used, these being provided with a roof which can be raised and lowered.

This can be easily effected by means of hydraulic or mechanical jacks.

The complexes are fixes aligned in the aircraft hold, and are provided with communication doors between each other and with the aircraft, it being convenient to choose these doors from sliding, accordian or shutter doors.

The complexes can be anchored by means of devices fitted on loading the complexes, these devices preferably forming part of the complexes themselves and being completely removed on unloading the containers.

An advantageous anchoring device consists of an assembly of cables and pulleys connected to hooks disposed on the aircraft loading floor, the device being put under tension by means of winches or friction wheels.

As already stated, the complexes have been designed in all details, taking account of the limited space available. Their dimensions derive from a careful examination of, an experimental work carried out on the space-activity relationship necessary and sufficient for carrying out medical functions for which each container is designed.

Three standard complexes A, B and C are provided, their minimum dimensions being as follows: ceiling height approximately 1.90 m, width 2 m; length 2.5 m.

The complexes are aligned in the aircraft, preferably in the order indicated. However the sequence and number are not binding. The complex A allows surgical operations to be carried out, together with all the parallel activities such as anaesthesia, monitoring and radiographic examination.

The complex B can house four or six beds, and is used for preanaesthesia, post-operational observation, intensive care and cardio-respiratory monitoring.

The complex C comprises two spaces with different functions, on the left hand side one bed for reanimation, cardio-respiratory monitoring, isolation and intensive care, and on the right hand side a laboratory with a refrigerated blood bank and steriliser. These complexes are provided with wheels or skids, and when not in operation they are deposited in a hangar or some other location on an airfield, and when required for use they are transported by a truck to the aircraft, and loaded thereon.

It is however preferable for the complexes to be loaded onto and unloaded from a suitable vehicle on wheels capable of housing one or more aligned complexes. This vehicle, which can be towed by a tractor, will be described hereinafter simply as "vehicle". The vehicle is constituted by a body or preferably rectangular cross-section, provided at one end with a vertically mobile platform suitable for conveying each complex to the level of the aircraft loading floor.

At its other end, the vehicle is provided with a winch for transferring the complexes from the aircraft to the vehicle, and with connections for enabling it to be towed.

If required, the vehicle can be provided with a side corridor or corridors to facilitate personnel movement.

One embodiment of the invention is described hereinafter by way of non-limiting example, and illustrated in the accompanying drawings.

The aircraft used by way of example in the embodiment of the invention is the EMB CH47C helicopter.

It is provided with a rear door which enables objects to be loaded, the maximum height of which is a function of their length, but which cannot exceed 1.65 m.

FIGS. 12 and 13 are a side view and front view of the vehicle;

FIG. 14 illustrates one stage during the unloading of the complexes from the vehicle and their loading into the helicopter;

Figure 1:
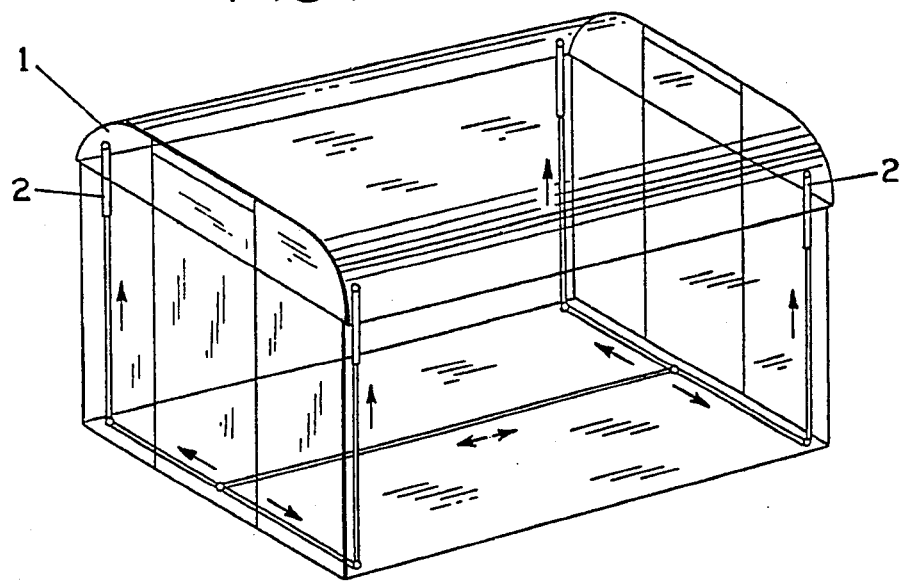
FIG. 1 is a diagrammatic isometric view of the container of a complex, in which the medical equipment is missing in order to demonstrate the control of the mobile roof.

With reference to FIG. 1, the complex is provided with a mobile roof 1, which is raised by four jacks 2 operated simultaneously. The complex thus reaches its maximum height of 1.95 m when inside the aircraft.

Figure 2:
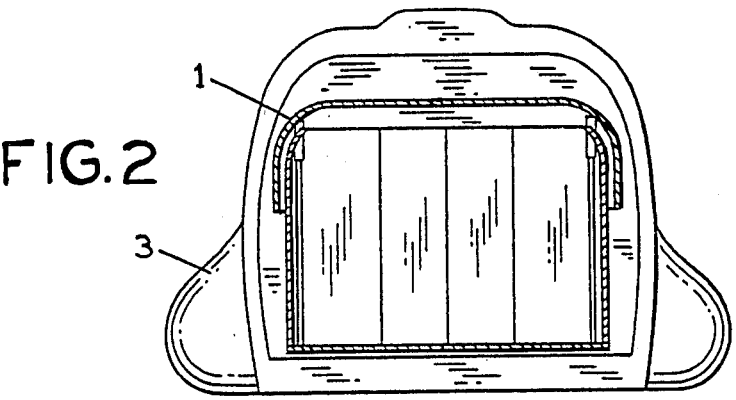
FIGS. 2 and 3 are diagrammatic vertical sections through the body of a helicopter containing the complex, with its roof lowered and raised respectively.
Figure 3:
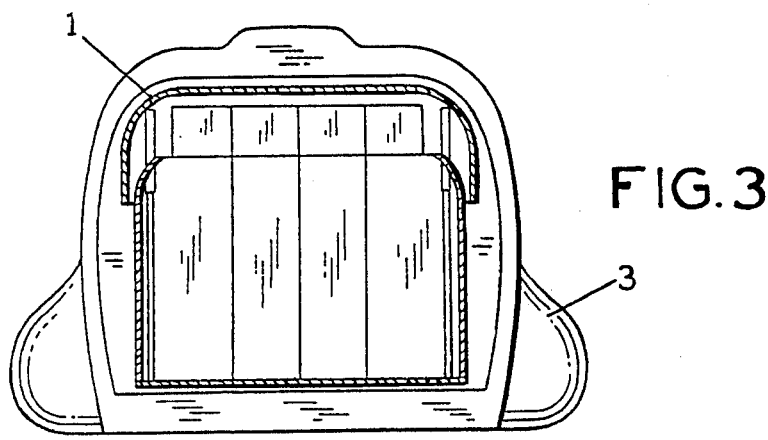

FIG. 2 shows the complex disposed in the helicopter hold 3 with its roof lowered. In FIG. 3, the roof is raised.

Figure 4:
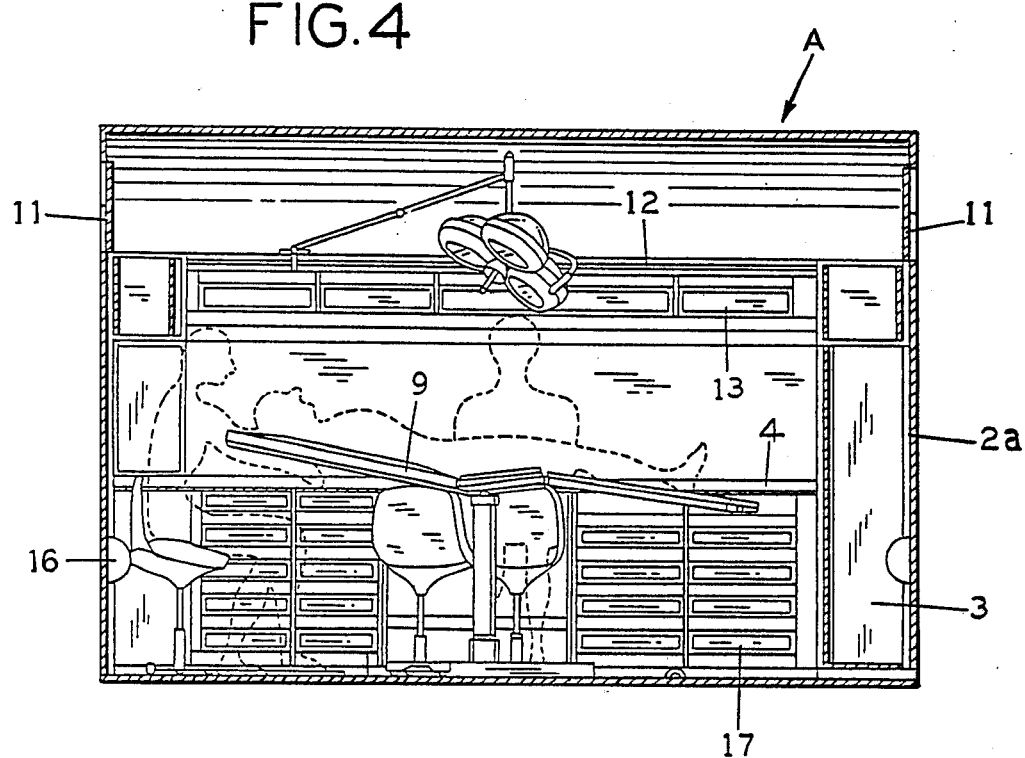
FIGS. 4 and 5 are a plan view and longitudinal sectional view of a complex A.
Figure 5:
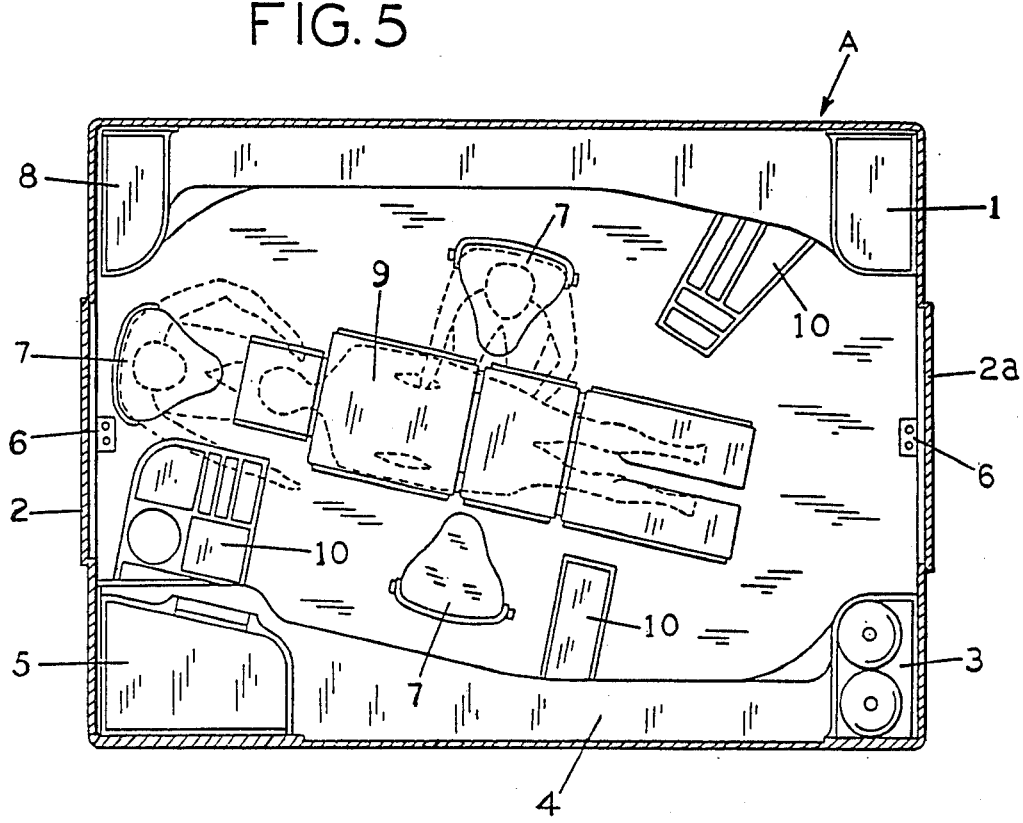

With reference to FIGS. 4 and 5, the complex of type A is equipped as an operating theatre, and has a maximum length of six modules, each of 51 cm, one module being equal to the distance between two successive hooks disposed on the loading floor of the helicopter of which they form part. Its height is either 1.65 m or 1.95 m, depending upon whether the roof is in its lower or upper position. This complex is provided with an operating table 9 illuminated by a spotlamp which can slide in a suitable slide track 12, X-ray equipment and equipment for developing plates housed at 8, anaesthesia equipment 5, and a housing 3 for oxygen and nitrous oxyde cylinders.

The figures also show the soiled and clean store 1, working benches 4, the fairlead 6 for loading and unloading the complex, seats 7 for operators, extractable shelves 10 and sliding doors 2, the reclinable panel 11 for closing the sliding doors 2, wall cabinets 13, the opening 16 for connecting the cable to the winch, not shown, for anchoring the complex to the helicopter, and the chest of drawers 17. The complex is also provided with a porthole in the longitudinal wall in front of the operator, and a housing for a seat, neither of which are shown.

Figure 6:
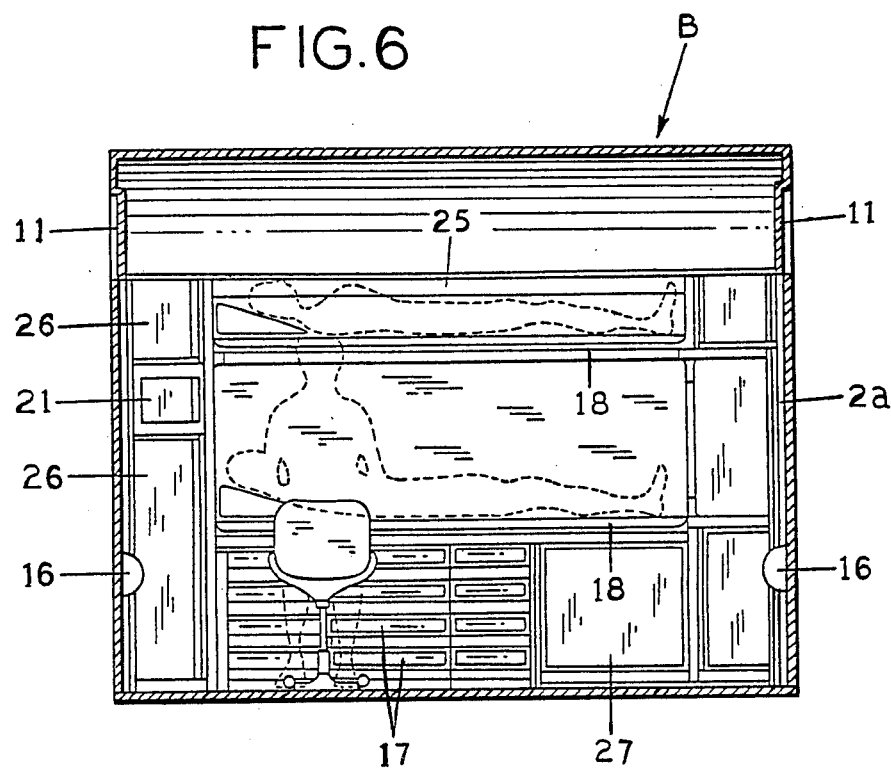
FIGS. 6 and 7 are a plan view and longitudinal sectional view of a complex B.
Figure 7:
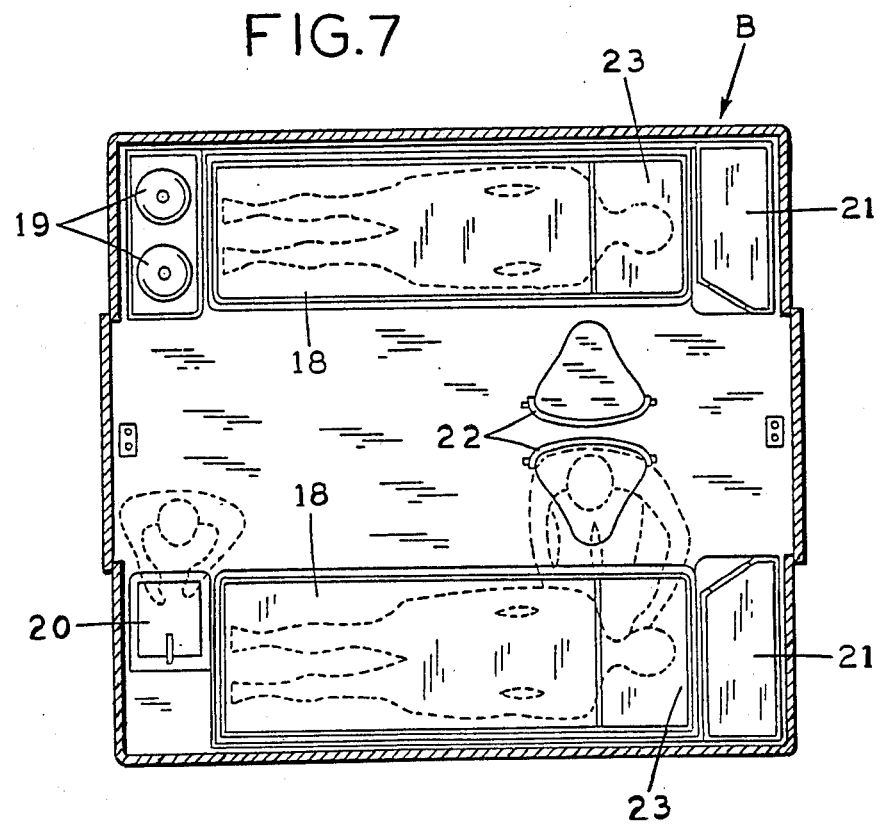

With reference to FIGS. 6 and 7, the complex of type B is equipped for preanaesthesia and intensive care.

It has a length of 5 modules (each module 51 cm) and a height variable from 1.65 to 1.95 m between the "lowered roof" and "raised roof" positions. This complex is provided with removable beds 18, a housing for an oxygen cylinder 19, a washbasin 20, a lung monitoring and ventilation system 21, retractable seats 22, a bed headpiece 23 on which current, pressure and vacuum sockets, not shown, are installed, reclinable element 11, a channel for housing the energy supply elements 25, cabinets 26, a chest of drawers 17, a seat housing 27 and apertures 16 for fixing the complex to the helicopter.

Figure 8:
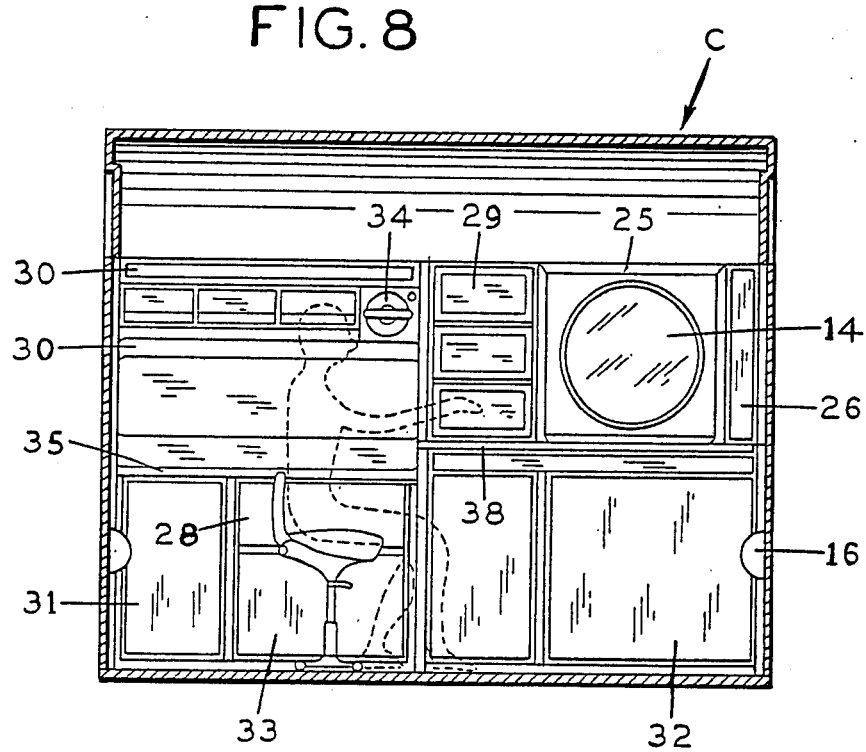
FIGS. 8 and 9 are a plan view and longitudinal sectional view of a complex C.
Figure 9:
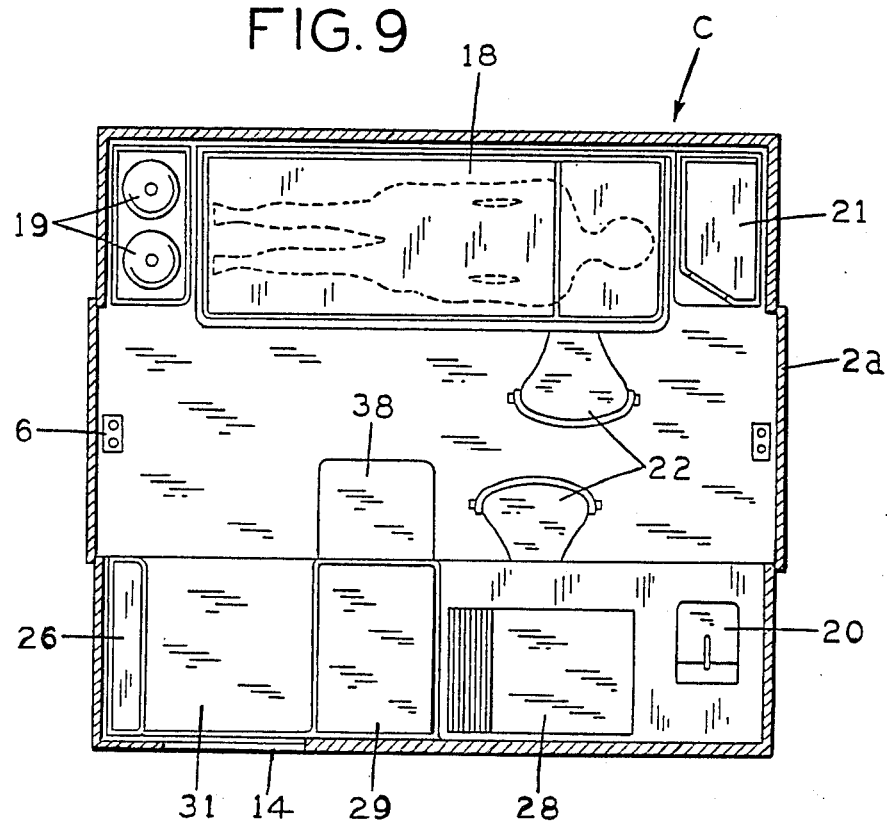

With reference to FIGS. 8 and 9, the complex of type C, equipped for reanimation and laboratory work, has a length of 5 modules, each of 51 cm, and a height which is variable as before.

The complex is provided with a refrigerated blood bank 28, a refrigerator with freezer 29, an extractable shelf 38, a workbench 34, retractable seats 22, a removable bed 18, a washbasin 20, a fairlead 6, a lung monitoring and ventilation system 21, reclinable elements 11, strip lights 30, a wall cabinet 13 and a cabinet 26, a seat housing 27, a water store 31, apertures 16 for fixing complex, a housing for oxygen cylinders 19, sliding doors 2, a housing for the energy supply elements 25, a housing for the electrical generator 32, a housing for the stand-by compressor 33, a steriliser 34 and porthole 14.

Figure 10:
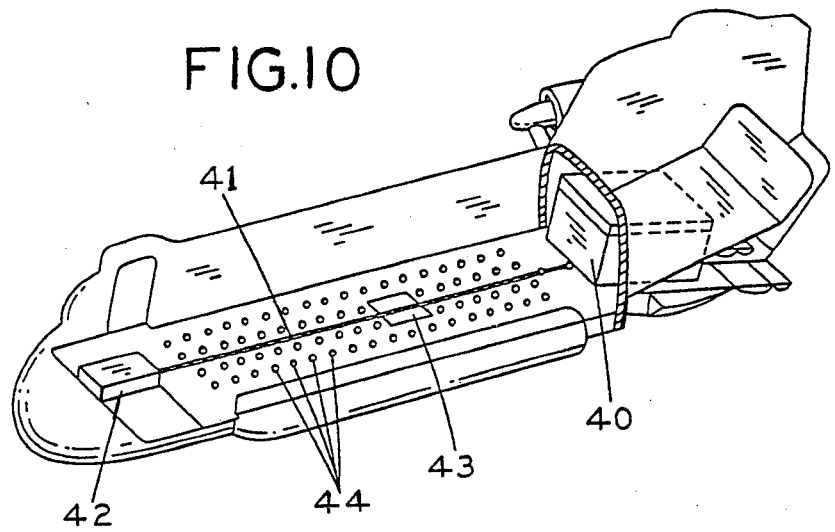
FIG. 10 is a partly sectional view of the helicopter, during the loading of a complex.
Figure 11:
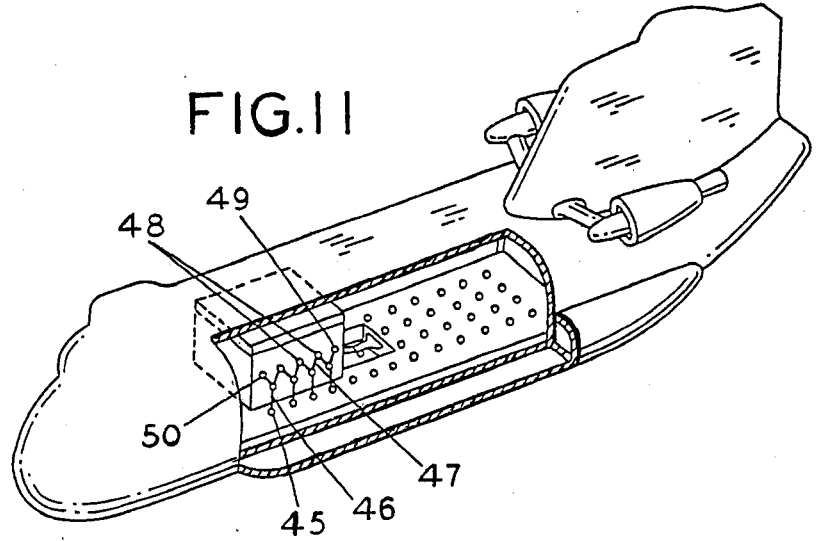
FIG. 11 is a partly sectional view of the helicopter, showing in detail a device for anchoring the complexes to the helicopter.

FIGS. 10 and 11 show a complex being loaded on to the helicopter. The complex 40 with its roof lowered is pulled towards the head by the cable 41 of the helicopter winch 42 into its predetermined position. The other two complexes are then loaded in a like manner. The complexes are then anchored to the helicopter structure by two equal devices located on the outside of the longitudinal opposing faces of each complex.

As shown in FIGS. 10 and 11, each device in its diagrammatically most simple form consists of a cable 47 fixed by its end 49 to the complex and resting over pulleys 48 fixed directly or indirectly to the complex. The cable 47 passes into the hooks 45, which form part of the helicopter loading floor and can be extracted from their housings 44, and is fixed at its end 50 to a small winch, not shown, which can be operated from inside the complex. The purpose of the apertures 15, see for example FIG. 6, is to fix one end 50 of the cable either directly to the complex or to said small winch.

The closure cover of the winch on board the helicopter for lifting loads is indicated by 43.

The vehicle shown in FIGS. 12 and 13 comprises a body of square cross-section 60 mounted on trolleys 61, support feet 63, a vertically mobile platform 62 which can raise each complex, if necessary from the ground, to the level of the aircraft loading floor, a winch 44 with its cable 65 and return pulley 66, and a towing hook 67.

Figure 15:
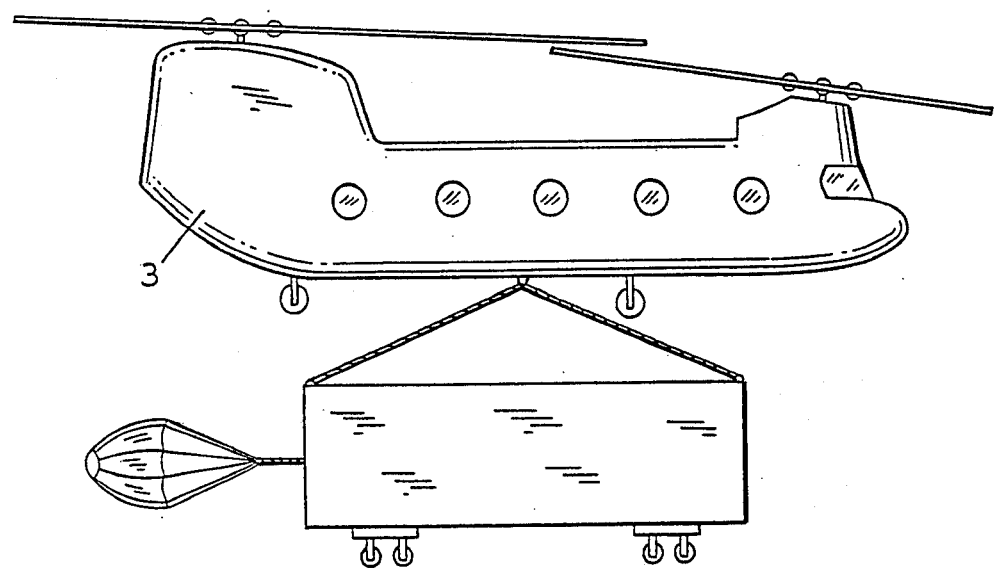
FIG. 15 is a diagrammatic illustration of the method of transporting the vehicle by suspending it from the aircraft hook.
Figure 16:
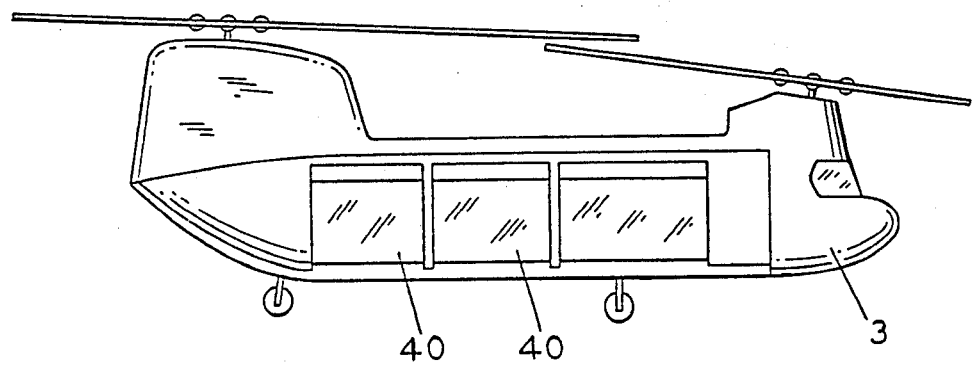
FIG. 16 is a diagrammatic illustration of the method of transporting the complexes when loaded into the aircraft.

FIG. 14 shows one stage during the unloading of the complexes, with their roofs lowered, from the helicopter into the vehicle. FIGS. 15 and 16 show two helicopters flying towards their destination. The generally empty vehicle is hooked to one of these by a winch on board, and its position is stabilised by a small parachute.

The three complexes, possibly already operational, are disposed in the other helicopter.

What we claim is:

1. A medical complex for installation in a standard cargo helicopter having an enclosed cargo compartment and a door to said cargo compartment through which cargo to said cargo compartment is loaded, said door having a height less than the height of said cargo compartment, said medical complex, when installed in said helicopter, converting the cargo compartment in said helicopter into an emergency surgical unit, which medical complex, when not installed in said helicopter, is able to be operated on the ground and, when installed in said helicopter, is able to be operated in flight, and is essentially constituted by an integrated assembly of medical equipment and fittings, an outer container with a roof and a general services network, means on said complex for lowering said roof on the container for loading said complex through said door and into the cargo compartment of said helicopter and for raising said roof in said cargo compartment when said complex is in said compartment and in medical use, and means for anchoring said raised complex in said helicopter compartment, said emergency surgical unit substantially completely filling said cargo compartment when said unit is in said compartment and said roof is raised so that the interior of said surgical unit is effectively the interior of said helicopter, said helicopter being adapted for general cargo use when said medical complex is unloaded from said cargo compartment.

2. A complex as claimed in claim 1, in which said anchored means is a device integral with the complex.

3. A complex as claimed in claim 1 provided with wheels.

4. A complex, as claimed in claim 1, in which said lowering and raising means includes jack means.

* * * * *